United States Patent Office 3,808,221
Patented Apr. 30, 1974

3,808,221
ANTIANDROGENIC N-[(3,5 - DILOWER ALKYL-4-HETEROCYCLIC)METHYL]PHTHALIMIDES
Alfred Boris, Parsippany-Troy Hills, and John William Scott, Upper Montclair, N.J., assignors to Hoffmann-La Roche Inc., Nutley, N.J.
No Drawing. Continuation-in-part of abandoned application Ser. No. 134,092, Apr. 14, 1971. This application Dec. 7, 1971, Ser. No. 205,760
Int. Cl. C07d 57/00, 99/04, 99/10
U.S. Cl. 260—302 H 32 Claims

ABSTRACT OF THE DISCLOSURE

A novel class of non-steroidal antiandrogenic compounds are described. The compounds can be generically designated as N-[(3,5-dilower alkyl-4-heterocyclic)methyl]phthalimides and derivatives of the aromatic ring thereof.

REFERENCE TO RELATED APPLICATIONS

The present application is a continuation-in-part of our co-pending U.S. patent application Ser. No. 134,092, filed Apr. 14, 1971, titled "Antiandrogenic Compounds," now abandoned.

BRIEF DESCRIPTION OF THE INVENTION

The present invention relates to a novel class of non-steroidal antiandrogenic compounds of the formula

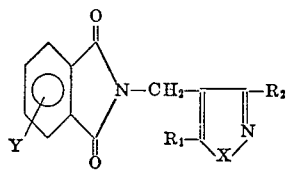

wherein X is —O—, —S— or —NR$_4$— wherein R$_4$ is hydrogen or lower alkyl; Y is

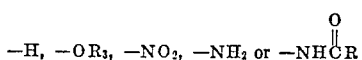

where R is lower alkyl or aryl and R$_3$ is lower alkyl or hydrogen; and R$_1$ and R$_2$ each independently is lower alkyl, provided, that when X is O, Y is attached to the 4-carbon atom when Y is —OR$_3$ and the 3-carbon atom when Y is —NO$_2$.

In preferred embodiments Y is

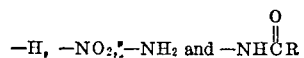

where R preferably is lower alkyl, i.e., methyl, R$_1$ is methyl and R$_2$ is methyl or ethyl. Preferred embodiments are represented by the following compounds:

X is O—
 N-[(3,5-dimethyl-4-isoxazolyl)methyl]-3-nitro-phthalimide
 4-amino-N-[(3,5-dimethyl-4-isoxazolyl)methyl]phthalimide
 N-[(3,5-dimethyl-4-isoxazolyl)methyl]phthalimide
 N-[(3-ethyl-5-methyl-4-isoxazolyl)methyl]phthalimide
 3-amino-N-[(3,5-dimethyl-4-isoxazolyl)methyl]phthalimide
 4-acetamido-N-[(3,5-dimethyl-4-isoxazolyl)methyl]phthalimide
 3-acetamido-N-[(3,5-dimethyl-4-isoxazolyl)methyl]phthalimide
 4-hydroxy-N-[(3,5-dimethyl-4-isoxazolyl)methyl]phthalimide
 4-methoxy-N-[(3,5-dimethyl-4-isoxazolyl)methyl]phthalimide X is S—
 N-[(3,5-dimethyl-4-isothiazolyl)methyl]phthalimide
 N-[(3,5-dimethyl-4-isothiazolyl)methyl]-3-nitro-phthalimide
 N-[(3,5-dimethyl-4-isothiazolyl)methyl]-4-nitro-phthalimide
 3-acetamido-N-[(3,5-dimethyl-4-isothiazolyl)methyl]phthalimide
 4-acetamido-N-[(3,5-dimethyl-4-isothiazolyl)methyl]phthalimide
 3-amino-N-[(3,5-dimethyl-4-isothiazolyl)methyl]phthalimide
 4-amino-N-[(3,5-dimethyl-4-isothiazolyl)methyl]phthalimide X is NR—
 N-[(3,5-dimethyl-4-pyrazolyl)methyl]phthalimide
 N-[(3,5-dimethyl-4-pyrazolyl)methyl]-3-nitro-phthalimide
 N-[(3,5-dimethyl-4-pyrazolyl)methyl]-4-nitro-phthalimide
 3-acetamido-N-[(3,5-dimethyl-4-pyrazolyl)methyl]phthalimide
 4-acetamido-N-[(3,5-dimethyl-4-pyrazolyl)methyl]phthalimide
 3-amino-N-[(3,5-dimethyl-4-pyrazolyl)methyl]phthalimide
 4-amino-N-[(3,5-dimethyl-4-pyrazolyl)methyl]phthalimide
 N-[(1,3,5-trimethyl-4-pyrazolyl)methyl]phthalimide.

As used herein the term lower alkyl is meant to include straight or branched chain hydrocarbon radicals having from 1 to 7 carbon atoms such as methyl, ethyl, n-butyl, t-butyl, n-hexyl, n-heptyl and the like. The term aryl is meant to include mono- or bi-cyclic aromatic radicals such as preferably phenyl or phenyl substituted with lower alkyl, lower alkoxy having from 1 to 7 carbon atoms, nitro or halogen.

Compounds of Formula I wherein X is —O—, R$_1$ and R$_2$ are each methyl and Y is hydrogen or nitro may be conveniently prepared by various methods. These methods are summarized below in Reaction Scheme I.

REACTION SCHEME I

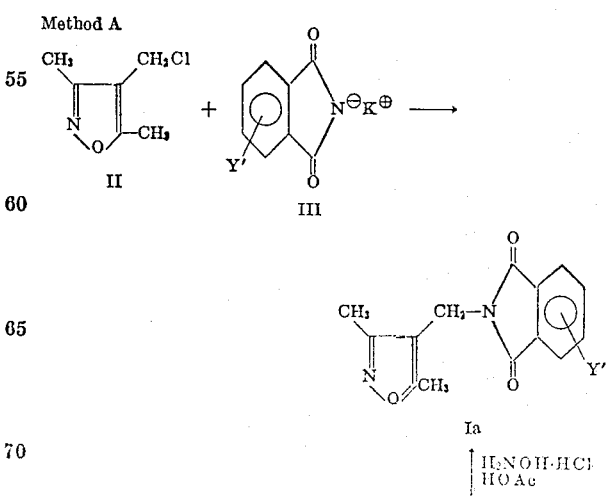

Method B

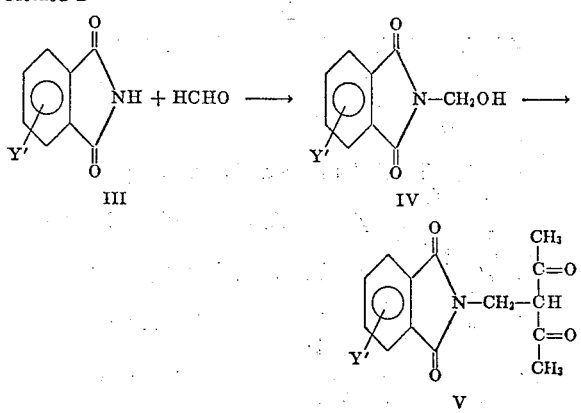

where Y' is —H or —NO$_2$.

As indicated in method A of the aforesaid Reaction Scheme I compounds of Formula Ia may be prepared directly by the reaction of 4-chloromethyl-3,5-dimethylisoxazole II with the potassium salt of the phthalimide Compounds III in a suitable inert organic solvent such as DMF. Alternatively, compounds of Formula Ia may be prepared from phthalimide Compound III as shown in method B by reaction of the latter with aqueous formaldehyde to give the N-hydroxymethyl Compounds IV which when treated with acetylacetone in strong mineral acid, i.e., conc. H$_2$SO$_4$, yielded Compounds V. Reaction of Compounds V with hydroxylamine hydrochloride preferably in an organic acid medium, i.e., acetic acid, yielded the desired compounds of Formula Ia.

Conversion of compounds of Formula Ia where Y' is NO$_2$ to compounds having the remaining substituent group meanings for Y, that is

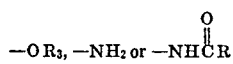

may be readily accomplished by the following reactions summarized in Reaction Scheme II.

REACTION SCHEME II

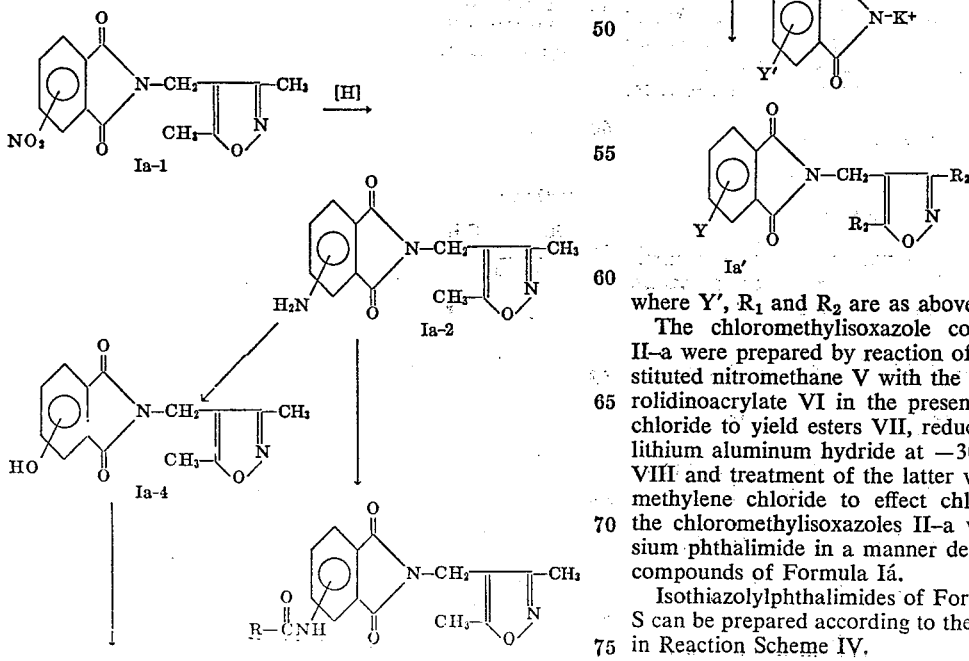

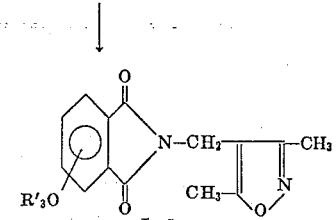

where R'$_3$ is lower alkyl.

The nitro substituted compounds of Formula Ia–1 can be reduced to the corresponding amino compounds of Formula Ia–2 by chemical reduction or catalytic hydrogenation by methods known per se, e.g., by treatment of the former chemicals with stannous chloride in hydrochloric acid, or by hydrogenation in the presence of a noble metal catalyst, i.e., Pd on carbon. Acylation of the amine compounds yields the desired amides of Formula Ia–3. The amine compounds can alternatively be diazotized and then warmed in the usual manner to produce the phenols of Formula Ia–4. Alkylation of the phenols with a suitable alkylating agent, i.e., a dialkylsulfate, yields the lower alkyl ethers of Formula Ia–5.

Where it is desired to prepare compounds of Formula Ia where R$_1$ and R$_2$ are other than methyl, a procedure according to Reaction Scheme III may be employed.

REACTION SCHEME III

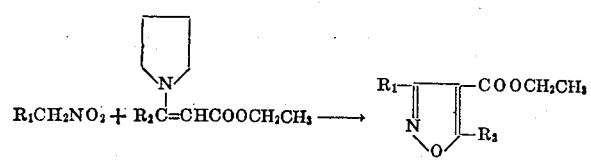

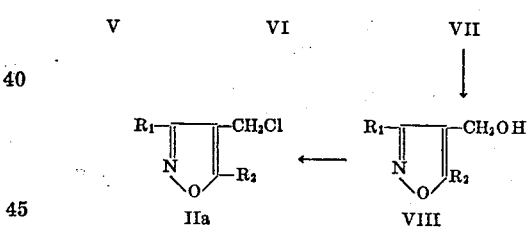

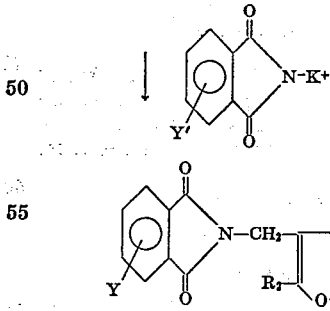

where Y', R$_1$ and R$_2$ are as above.

The chloromethylisoxazole compounds of Formula II–a were prepared by reaction of the appropriately substituted nitromethane V with the substituted ethyl β-pyrrolidinoacrylate VI in the presence of phosphorus oxychloride to yield esters VII, reduction of the esters with lithium aluminum hydride at −30° C. to form alcohols VIII and treatment of the latter with thionyl chloride in methylene chloride to effect chlorination. Reaction of the chloromethylisoxazoles II–a with the desired potassium phthalimide in a manner described above gives the compounds of Formula Iá.

Isothiazolylphthalimides of Formula I, i.e., where X is S can be prepared according to the procedure summarized in Reaction Scheme IV.

REACTION SCHEME IV

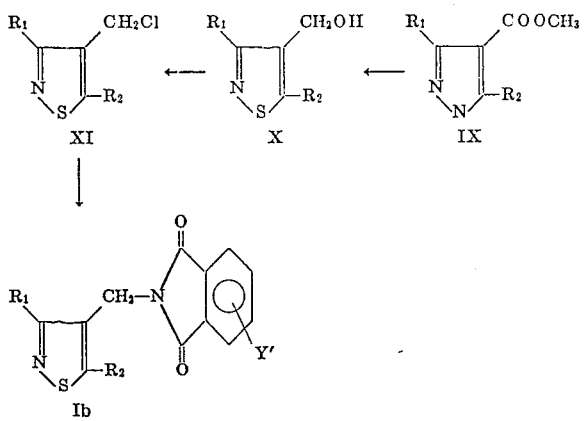

As seen in Reaction Scheme IV the 4-carbomethoxy-3,5-disubstituted isothiazole IX is reduced to the alcohol X employing LiAlH$_4$ as before. Conversion to the chloride XI and condensation with the desired potassium phthalimide compound yields compounds of Formula Ib utilizing procedures previously described. Compounds of Formula Ib where Y' is nitro may be converted to the other definitions of the group Y i.e., amino, hydroxy, lower alkoxy or acylamino in analogous manner as described in Reaction Scheme II for the isoxazolyl series.

Pyrazolphthalimides of Formula I, i.e., where X is NR$_4$, may be conveniently obtained by condensing the appropriately substituted N-(2,2-diacylethyl) phthalimide XII with hydrazine hydrate or mono-lower alkyl hydrazine, i.e., methyl hydrazine in acetic acid according to the procedure indicated in Reaction Scheme V.

REACTION SCHEME V

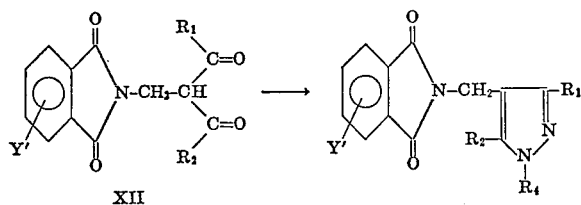

where Y', R$_1$, R$_2$ and R$_4$ are as above.

Compounds of Formula Ic formed as above where Y' is nitro may be converted as before into the remaining derivatives of Formula I with regard to substituent group Y.

The compounds of Formula I are useful as anti-androgens. Thus, they may be used, for example, as an anti-acne agent; in the treatment of virilizing, hirsutism, benign prostatic hypertrophy, male hypersexuality and to counteract secondary male characteristics induced by male hormone treatment of female cancers. Since the compounds of the present invention are not steroidal they exhibit the advantage of being free of the side effects normally associated with steroidal antiandrogens.

The compounds of the present invention can be administered topically or internally, for example, orally or parenterally. Dosage should be adjusted to individual needs. For example, suitable daily oral or parenteral dosage in the human would generally be in the range of from about 0.1 to 0 mg./kg., administered preferably in divided doses.

The instant compounds can be administered in conventional solid and liquid pharmaceutical dosage forms such as capsules, tablets, suppositories, solutions, suspensions, creams, gels or the like. They can contain conventional pharmaceutical additives such as stearly alcohol, ethyl alcohol, petrolatum, polyalkylene glycols, water, carnauba wax, lactose, corn starch, calcium stearate, talc or the like. They can be submitted to conventional pharmaceutical expedients such as sterilization and can contain preservatives, emulsifying agents, agents for the adjustment of osmotic pressure and the like. Suitable oral and parenteral dosage forms can contain from 10 to 500 mg. of the compounds of the instant invention. Topical dosage forms can contain from 2 to 10 percent of compound of the present base with the remainder of the composition comprising conventional topical pharmaceutical carriers.

The present invention is further illustrated by the following examples. All temperatures are in degree centigrade.

EXAMPLE 1

N-[(3,5-dimethyl-4-isoxazolyl)methyl]phthalimide

To a suspension of 306 g. (2.08 moles) of phthalimide in 1.05 l. of water was added 168 ml. of (2.08 moles) of 35% (w./w.) formaldehyde solution and the resulting mixture was heated at reflux for 0.25 hr. The clear solution was filtered while hot and cooled, finally overnight in a refrigerator at 4°, to give 360.6 g. (97% yield) of N-hydroxymethylphthalimide, M.P. 137–143.5°.

In a dry flask under N$_2$, 1 l. of concentrated sulfuric acid (95–97% H$_2$SO$_4$) was cooled in an ice-methanol bath to —5°. The acid was stirred as 112.5 ml. (110 g.=1.10 moles) of acetylacetone (redistilled before use) was added at a rate such that the temperature stayed less than 0°. This took 1.25 hr. The solution was stirred another 0.25 hr. and then 177.15 g. (1.0 mole) of N-hydroxymethylphthalimide, prepared as described above, was added with good stirring over 10 min. The mixture was stirred with cooling for 1.5 hrs., during which time most of the solid dissolved, and then at room temperature for another 44 hr. The red-orange solution was then poured onto ice, slurried well, and filtered. The solids were three times slurried with 1 l. of water on the funnel and sucked dry. The damp yellow filter cake was dissolved in approximately 2 l. of hot ethanol, filtered while hot, warmed to redissolve all the material, and cooled, finally overnight at 4° in a refrigerator, to give 189 g. of fine white needles, sintering at 117°, M.P. 125.5–132.0°. This product was suspended in 1.5 l. of hot ethanol. To the flask was added enough water (15 ml.) to bring all the material into solution. Cooling as before gave 171.7 g. (66% yield) of N-(2,2-diacetylethyl)-phthalimide as fine white needles, sintering 117°, M.P. 123.5–125.5°.

To a suspension of 129.63 g. (0.50 mole) of N-(2,2-diacetylethyl)phthalimide, prepared as described above, in 1 l. of glacial acetic acid was added 34.75 g. (0.50 mole) of hydroxylamine hydrochloride and the resulting mixture was heated at reflux for 3.0 hr. A vigorous evolution of hydrogen chloride was observed as the solution reached the boiling point. The light yellow solution was cooled and stripped of solvent on a rotary evaporator. The residual light yellow solid was dissolved in 1 l. of chloroform. This solution was washed with 3× 100 ml. of 2 N sodium hydroxide solution and 250 ml. of water and dried over anhydrous sodium sulfate. The chloroform was removed on a rotary evaporator until approximately 700 ml. of solution remained. This material was boiled with 10 g. of active carbon, filtered, and stripped of solvent to give 124.6 g. of white solid which was homogeneous to TLC. The crude product was dissolved in 200 ml. of methylene chloride. To this solution was added 1 l. of ether, at which time crystallization began. Cooling, finally to —20°, gave 110.1 g. (86% yield) of N-[(3,5-dimethyl-4-isoxazolyl)methyl]phthalimide as colorless (white) needles. M.P. 123–125.5°.

EXAMPLE 2

N-[(3,5-dimethyl-4-isoxazolyl)methyl]phthalimide (alternative procedure)

A solution of 320 ml. (325 g.=2.5 moles) of ethyl acetoacetate, 209 ml. (178 g.=2.5 moles) of pyrrolidine and 600 ml. of benzene was heated at reflux with azeotropic removal of water for 2 hr. The benzene was then removed at reduced pressure (rotary evaporator) and the residue was distilled through a 10-cm. Vigreux column to give 427 g .(93% yield) of ethyl β-pyrrolidinocrotonate as a light yellow liquid, B.P. 155–156°/10 mm.

A solution of the ethyl β-pyrrolidinocrotonate (427 g.=2.33 moles), 190 ml. (182 g.=2.43 moles) of nitroethane (practical grade), and 1.3 l. of triethylamine in 1.2 l. of anhydrous chloroform was stirred in an ice-bath under $N_2$. A solution of 235 ml. (393 g.=2.56 moles) of phosphorous oxychloride in 400 ml. of chloroform was added at such a rate that the temperature remained less than 15°. During the addition time (3.0 hr.) a viscous orange precipitate formed. This suspension was then stirred at room temperature overnight. As much solvent as possible was removed on the rotary evaporator at 50°. The resulting red-brown paste was diluted with water and extracted with ether. The ether solutions were washed in turn with water, 3 N hydrochloric acid, water 5% sodium hydroxide solution, and water, and were dried over anhydrous sodium sulfate. Solvent removal at reduced pressure gave a dark oil which was distilled through a short Vigreux column to give 275 g. (72% yield) of 4-carboethoxy-3,5-dimethylisoxazole as a slightly cloudy colorless liquid of B.P. 100°/11 mm.

A suspension of 12.0 g. (0.32 mole) of lithium aluminum hydride in 100 ml. of tetrahydrofuran (freshly filtered through aluminum oxide, activity grade I) was cooled under $N_2$ in a Dry Ice-acetone bath to −40°. A solution of 48.2 g. (0.285 mole) of 4-carboethoxy-3,5-dimethylisoxazole, prepared as described above, in 100 ml. of tetrahydrofuran was added over 1.0 hr. as the temperature was kept at −30 to −40°. The mixture was stirred at this temperature for another 1.5 hr., cautiously hydrolyzed with 50 ml. of saturated aqueous sodium sulfate solution and allowed to warm to 20°. The solids were removed by filtration and washed well with fresh tetrahydrofuran. The combined filtrates were stripped of solvent, taken up in methylene chloride and dried over anhydrous sodium sulfate. Solvent removal gave a white solid which was crystallized from methylene chloride-ether to give 29.7 g. (82% yield) of 4-hydroxymethyl-3,5-dimethylisoxazole as small white prisms, M.P. 76–77°.

A solution of 36.3 ml. (60.0 g.=0.5 mole) of thionyl chloride in 50 ml. of methylene chloride was cooled in an ice bath under a very slight negative pressure (for fume removal). A solution of 40.0 g. (0.314 mole) of 3,5-dimethyl-4-hydroxymethylisoxazole in 80 ml. of methylene chloride was added over 1.0 hr. The solution was stirred at room temperature for 2.5 hr. and stripped of solvent on a rotary evaporator. The residual oil was distilled through a 20-cm. Vigreux column to give 37.7 g. (80% yield) of 4-chloromethyl-3,5-dimethylisoxazole as a light yellow, lachromatory liquid, B.P. 97°/16 mm.

To a solution of 103.5 g. (0.71 mole) of 4-chloromethyl-3,5-dimethylisoxazole, prepared as described above in 1 l. of dimethylformamide (distilled from calcium hydride), was added 140.0 g. (0.755 moles) of potassium phthalimide. The resulting mixture (exothermic) was stirred at room temperature under $N_2$ overnight, poured into water, and extracted with chloroform. The chloroform solutions were washed with water, 1 N sodium hydroxide solution and water and dried over anhydrous sodium sulfate. Solvent removal at reduced pressure gave a light yellow solid which was treated with active carbon in methylene chloride and then crystallized from methylene chloride-ether to give 141.2 g. (78% yield) of N[(3,5-dimethyl-4-isoxazolyl)methyl]phthalimide as fine white needles, M.P. 124.5–125.5°. A sample prepared in the same manner was crystallized twice from ether to give analytically pure product as colorless (white) needles, M.P. 125–127°.

EXAMPLE 3

N-[3-ethyl-5-methyl-4-isoxazolyl)methyl]phthalimide

The above captioned compound was prepared by the procedure of Example 2 from ethyl β-pyrrolidino-crotonate and 1-nitropropane via the following intermediates:

4-carboethoxy-3-ethyl-5-methylisoxazole, B.P. 73–78°/0.3 mm.
3-ethyl-4-hydroxymethyl - 5 - methylisoxazole, B.P. 58–60°/0.01 mm.
4-chloromethyl-3-ethyl-5-methylisoxazole, B.P. 98–100°/10 mm.

EXAMPLE 4

N-[(3,5-dimethyl-4-isoxazolyl)methyl]-3-nitrophthalimide

A mixture of 20.0 g. (0.104 mole) of 3-nitrophthalimide, 6.9 g. (0.050 mole) of anhydrous potassium carbonate, 14.5 g. (0.100 mole) of 4-chloromethyl-3,5-dimethylisoxazole, prepared as described in Example 2 and 200 ml. of dry dimethylformamide was degassed, placed under nitrogen, and heated at 140° C. for 2.0 hr. The mixture was cooled, poured into water and extracted with methylene chloride. The methylene chloride solutions were washed with water, 2% sodium hydroxide solution, and brine and dried over anhydrous sodium sulfate. Solvent removal gave a yellow solid which was crystallized twice (active carbon) from acetone-hexane to give the above-titled compound as light yellow prisms, M.P. 175–178.5° C., from acetone-hexane.

*Analysis.*—Calcd. for $C_{14}H_{11}O_5N_3$ (percent): C, 55.81; H, 3.68; N, 13.95. Found (percent): C, 55.60; H, 3.53; N, 13.92.

IR 1784, 1730 cm.$^{-1}$ (imide), 1634 cm.$^{-1}$ (isoxazole), 1548, 1395, 1354 cm.$^{-1}$ ($NO_2$).

UV $\lambda_{max.}$ 220 nm. ($\epsilon$=28,500), 290 nm. (sh., $\epsilon$=1,400).

EXAMPLE 5

By the method of Example 2, there have been prepared:

N-[(3,5-dimethyl-4-isothiazolyl)methyl]-3 - nitrophthalimide—light yellow powder, M.P. 176.5–178°, from $CH_2Cl_2$-ether N-[(3,5-dimethyl-4-isothiazolyl)methyl]-4 - nitrophthalimide—light yellow needles, M.P. 159–161°, from $CH_2Cl_2$-ether.

EXAMPLE 6

4-amino-N-[(3,5-dimethyl-4-isoxazolyl)methyl]phthalimide

To a rapidly stirred cold (ice bath) mixture of 20.0 g. (0.11 mole) of stannous chloride in 37.5 ml. of concentrated hydrochloric acid and 12.5 ml. of water was added 5.0 g. (16.6 mmoles) of N-[(3,5-dimethyl-4-isoxazolyl)methyl]-4-nitrophthalimide, followed by 100 ml. of concentrated hydrochloric acid. The resulting mixture was heated at 50° for 1.0 hr. The resulting solution was cooled, poured into 1 l. of water, stirred well for 1.0 hr. to effect complete hydrolysis, and filtered. The solids were washed well with warm (60°) water, sucked dry, and crystallized twice from acetone-hexane to give 3.0 g. (60% yield) of the desired amine as yellow needles, M.P. 218–220°. Two further crystallizations of this material from acetone-hexane gave an analytically pure sample as yellow needles, M.P. 221–223°.

*Analysis.*—Calcd. for $C_{14}H_{13}O_3N_3$ (percent): C, 61.98; H, 4.83; N, 15.49. Found (percent): C, 61.93; H, 4.70; N, 15.49.

EXAMPLE 7

N-[(3,5-dimethyl-4-isoxazolyl)methyl]-3-aminophthalimide

In analogous manner to the procedure of Example 6 N-[(3,5-dimethyl-4-isoxazolyl)methyl] - 3 - nitrophthalimide was converted to the above-captioned product which was obtained as yellow needles or dark yellow prisms, M.P. 183.5–185.5° C., from acetone-hexane.

Analysis.—Calcd. for $C_{14}H_{13}O_3N_3$ (percent): C, 61.98; H, 4.83; N, 15.49. Found (percent): C, 61.64; H, 4.54; N, 15.20.

IR 3514, 3400 cm.$^{-1}$ ($NH_2$), 1758, 1702 cm.$^{-1}$ (imide), 1635 cm.$^{-1}$ (isoxazole), 1591, 1482 cm.$^{-1}$ (aromatic ring).

UV $\lambda_{max}$. 204 nm. ($\epsilon=27,900$), 222 nm. ($\epsilon=25,100$), 236 nm. ($\epsilon=7,100$), 392 nm. ($\epsilon=5,500$).

EXAMPLE 8

4-acetamido-N-[(3,5-dimethyl-4-isoxazolyl)methyl]phthalimide

A solution of 13.55 g. (50 mmoles) of 4-amino-N-[(3,5-dimethyl-4-isoxazolyl)methyl]phthalimide and 10.2 g. (100 mmoles) of acetic anhydride was heated under $N_2$ at 80° overnight. The solution was cooled, diluted with chloroform, and washed with water, 1 N hydrochloric acid, water, saturated aqueous sodium bicarbonate solution and brine and dried over anhydrous sodium sulfate. The residue obtained upon solvent removal was crystallized (active carbon) twice from chloroform to give 8.5 g. (55% yield) of the desired amide as white prisms, M.P. 210.5–213°. A similarly prepared sample of M.P. 212.5–214.5° was submitted for analysis.

Analysis.—Calcd. for $C_{16}H_{15}O_4N_3$ (percent): C, 61.33; H, 4.83; N, 13.41. Found (percent): C, 61.31; H, 4.80; N, 13.43.

IR 3368 cm.$^{-1}$ (NH), 1760; 1709 cm.$^{-1}$ (imide), 1709 cm.$^{-1}$ (amide), 1640 cm.$^{-1}$ (isoxazole), 1615, 1487 cm.$^{-1}$ (aromatic ring), 1543 cm.$^{-1}$ (amide II), KBr pellet.

UV $\lambda_{max}$. 206 nm. ($\epsilon=21,800$), 212 nm. (sh., $\epsilon=21,300$), 240 nm. ($\epsilon=27,800$), 253 nm. ($\epsilon=27,600$), 260 nm. (sh., $\epsilon=23,700$), 285 nm. ($\epsilon=3,600$), 330 nm. ($\epsilon=4,300$).

EXAMPLE 9

3-acetamido-N-[(3,5-dimethyl-4-isoxazolyl)methyl]phthalimide

In analogous manner to Example 8 the above-titled compound was prepared from 3-amino-N-[(3,5-dimethyl-4-isoxazolyl)-methyl]phthalimide as cream-white needles, M.P. 181–182.5°, from methylene chloride-ether.

Analysis.—Calcd. for $C_{16}H_{15}O_4N_3$ (percent): C, 61.33; H, 4.83; N, 13.41. Found (percent): C, 61.58; H, 4.85; N, 13.43.

IR 3362 cm.$^{-1}$ (NH), 1769, 1708 cm.$^{-1}$ (imide), 1620, 1480 cm.$^{-1}$ (aromatic ring), 1532 cm.$^{-1}$ (amide II).

UV $\lambda_{max}$. 226 nm. ($\epsilon=36,400$), 252 nm. (sh., $\epsilon=14,000$), 341 nm. ($\epsilon=4,300$).

EXAMPLE 10

4-hydroxy-N-[(3,5-dimethyl-4-isoxazolyl)methyl]phthalimide

A solution of 18.6 g. (68.5 mmoles) of 4-amino-N-[(3,5 - dimethyl - 4 - isoxazolyl)methyl]phthalimide in 150 ml. of 1:1 sulfuric acid-water was cooled in an ice bath as a solution of 6.4 g. (93 mmoles) of sodium nitrite in 25 ml. of water was added over 20 min. The internal temperature rose to 10°. The mixture was stirred with cooling another 15 min., and then was heated to 90° and held at that temperature 1.0 hr. The orange solution was cooled, poured into water, and filtered. The solids were washed with 6 N sulfuric acid and water and sucked dry to give 14.7 g. of orange solid. This material was chromatographed on 1 kg. of 0.05–0.2 mm. silica gel. The material eluted with 8:2 benzene-ethyl acetate (8.4 g.) was crystallized from acetone to give 5.23 g. (23% yield) of 4 - hydroxy - N - [(3,5 - dimethyl - 4 - isoxazolyl)methyl]phthalimide as a cream-white powder, sintering 205°, M.P. 228–231.5°. Recrystallization from acetone gave an analytically pure sample of this compound, sintering 210°, M.P. 228–231°, as a white powder.

Analysis.—Calcd. for $C_{14}H_{12}O_4N_2$ (percent): C, 61.76; H, 4.44; N, 10.29. Found (percent): C, 61.67; H, 4.70; N, 10.27.

IR 3116 cm.$^{-1}$ (OH), 1768, 1718 cm.$^{-1}$ (imide), 1641 cm.$^{-1}$ (isoxazole), 1690, 1610, 1488 cm.$^{-1}$ (aromatic ring), KBr pellet.

UV$\lambda_{max}$ 208 nm. ($\epsilon=17,400$), 234 nm. ($\epsilon=35,200$), 331 nm. ($\epsilon=2,100$).

EXAMPLE 11

4-methoxy-N-[(3,5-dimethyl-4-isoxazolyl)methyl]phthalimide

To a solution of 4.80 g. (17.6 mmoles) of 4-hydroxy-N - [(3,5 - dimethyl-4-isoxazolyl)methyl]phthalimide in 80 ml. of dry dimethylformamide was added 2.43 g. (17.6 mmoles) of anhydrous potassium carbonate. The mixture was degassed, placed under $N_2$, and stirred at room temperature 6.0 hr. to give a cloudy orange solution. To the flask was added 2.8 ml. (5.05 g.=40 mmoles) of dimethylsulfate and stirring was continued at room temperature overnight. The mixture was then poured into water and extracted with chloroform. The chloroform solutions were washed with 1 N sodium hydroxide solution and water and dried over anhydrous sodium sulfate. The material obtained upon solvent removal was crystallized twice from methylene chloride-ether to give the desired ether as 4.00 g. (79% yield) of fine white needles, M.P. 170–172°.

Analysis.—Calcd. for $C_{15}H_{14}O_4N_2$ (percent): C, 62.93; H, 4.93; N, 9.79. Found (percent): C, 62.88; H, 4.80; N, 9.74.

IR 1772, 1715 cm.$^{-1}$ (imide), 1618, 1493 cm.$^{-1}$ (aromatic ring), 1290, 1136; 1037 cm.$^{-1}$ (aryl ether).

UV$\lambda_{max}$. 234 nm. ($\epsilon=36,300$), 252 nm. (sh., $\epsilon=15,700$), 280 nm. ($\epsilon=1,900$), 325 nm. ($\epsilon=2,200$).

EXAMPLE 12

N-[(3,5-dimethyl-4-pyrazolyl)methyl]phthalimide

To a suspension of 64.81 g. (0.25 mole) of N-(2,2-diacetylethyl)phthalimide in 400 ml. of acetic acid was added 13.35 ml. (13.76 g.=0.275 mole) of hydrazine hydrate. The resulting mixture was heated at reflux for 3.0 hr. to give a colorless solution which solidified upon cooling. The material was dissolved in 2 l. of chloroform, washed with 3 N sodium hydroxide solution (2× 1 l. and 2× 400 ml.) and water and dried over anhydrous sodium sulfate. Solvent removal gave a white solid. The material from two such reactions was dissolved in hot acetone (approx. 3 l.) concentrated to 1.5 l., at which point crystallization began, and cooled to give 98.0 g. (77% yield) of very small white needles, M.P. 197–198.5° A similarly prepared sample of M.P. 196–198° was submitted for analysis.

Analysis.—Calcd. for $C_{14}H_{13}O_2N_3$ (percent): C, 65.87; H, 5.13; N, 16.46. Found (percent): C, 65.98; H, 5.08; N, 16.55.

IR 3458, 3420 cm.$^{-1}$ (NH), 1772, 1715 cm.$^{-1}$ (imide), 1612, 1589 cm.$^{-1}$ (pyrazole).

UV$\lambda_{max}$. 218 nm. ($\epsilon=44,000$), 232 nm. (sh., $\epsilon=18,600$), 240 nm. ($\epsilon=10,700$), 295 nm. ($\epsilon=1,900$).

EXAMPLE 13

N-[(3,5-dimethyl-4-isothiazolyl)methyl]phthalimide

The above captioned compound was prepared by the procedures of Example 2 from 4-carbomethoxy-3,5-dimethylisothiazole via the following intermediates:

3,5-dimethyl-4-isothiazolemethanol, M.P. 44–48°.
4 - chloromethyl - 3,5 - dimethylisothiazole, B.P. 111–112°/13 mm.

EXAMPLE 14

By the methods of Example 1, there were prepared:

N-hydroxymethyl-3-nitrophthalimide—light yellow plates, M.P. 110–112°
N-hydroxymethyl-4-nitrophthalimide—light yellow plates, M.P. 157–159°
N-(2,2 - diacetylethyl) - 3 - nitrophthalimide—yellow needles M.P. 143–145.5°, from acetone
N - (2,2 - diacetylethyl) - 4 - nitrophthalimide—light yellow needles, M.P. 135–139°, from acetone
N - [(3,5 - dimethylpyrazol - 4 -yl)methyl] - 3 - nitrophthalimide—light yellow needles, M.P. 226.5–228°, from acetone.

EXAMPLE 15

By the method of Example 6, there were prepared:
3-amino-N-[(3,5-dimethyl-4-isothiazolyl)methyl]phthalimide—yellow powder, M.P. 186–187.5°, from acetone-hexane
4-amino-N-[(3,5-dimethyl-4-isothiazolyl)methyl]phthalimide—pale yellow needles, M.P. 247.5–248°, from acetone-hexane.

EXAMPLE 16

By the method of Example 8, there was prepared: 3-acetamido-N-[(3,5-dimethyl - 4 - isothiazolyl)methyl]phthalimide—fine, white needles, M.P. 205.5–206.5°, from $CH_2Cl_2$-ether.

EXAMPLE 17

3-amino-N-[(3,5-dimethylpyrazol-4-yl)methyl]phthalimide

A suspension of 40.0 g. (0.13 mole) of N-[(3,5-dimethylpyrazol-4-yl)methyl]-3-nitrophthalimide and 4 g. of 5% palladium on carbon catalyst in 1.0 l. of methanol was hydrogenated at atmospheric pressure and room temperature. After 5.0 hr., the uptake of hydrogen (3.2 l.) had ceased. The mixture was heated to dissolve the suspended product and filtered to remove the catalyst. Solvent removal from the filtrates, followed by crystallization of the residue from acetone-ether gave the desired amine as a yellow-orange powder, M.P. 210–212.5°.

Similarly prepared was: 4-amino-N-[(3,5-dimethylpyrazol-4-yl)methyl]phthalimide—yellow powder, M.P. 226–227.5°, from acetone-ether.

EXAMPLE 18

The antiandrogenic activity of sample compounds of this invention was determined employing the following method.

Charles River rats were castrated at 22 days of age and treated for seven consecutive days beginning seven days post castration. Compounds were dissolved or suspended in sesame oil and administered in a volume of 0.2 ml./rat/day, either orally or subcutaneously. Testosterone propionate was administered concurrently by separate subcutaneous injection at a different body site at a dosage of 20 μg./0.2 ml./rat/day in sesame oil. Each treatment group consisted of 7 to 8 rats. All rats were autopsied on the day after the last treatment day. The mean organ weights of the seminal vesicles and the ventral prostates were determined for each group and compared to the respective mean organ weights obtained from a control group receiving testosterone propionate and the carrier vehicle only. The results of this experiment are summarized in Table 1.

TABLE 1.—STRUCTURES AND SCREENING RESULTS

| Compound | Dose, mg./rat/day | Percent inhibition of T.P. response | |
|---|---|---|---|
| | | Seminal vesicles | Ventral prostate |
| N-[(3,5-dimethyl-4-isoxazolyl)-methyl]phthalimide. | 4 s.c. 4 p.o. 8 p.o. | [1] 76 [2] 43 [1] 38 | [1] 66 [2] 45 [3] 38 |
| N-[(3,5-dimethyl-4-isoxazolyl)-methyl]-3-nitrophthalimide. | 4 s.c. 4 p.o. 8 p.o. | [3] 32 26 [1] 35 | [3] 32 [2] 37 [1] 42 |
| 4-amino-N-[(3,5-dimethyl-4-isoxazolyl)methyl]phthalimide. | 4 s.c. 4 p.o. 8 p.o. | [2] 42 [3] 37 [1] 47 | [1] 39 [1] 40 [2] 47 |
| N-[(3-ethyl-4-methyl-4-isoxazolyl)-methyl]phthalimide. | 4 s.c. 4 p.o. 8 p.o. | [1] 49 [3] 32 8 | [1] 29 [1] 40 8 |
| N-[(3,5-dimethyl-4-isoxazolyl)-methyl]-3-aminophthalimide. | 4 s.c. 4 p.o. 8 p.o. | [1] 79 [2] 49 [1] 46 | [1] 78 [1] 53 [2] 42 |
| 4-acetamido-N-[(3,5-dimethyl-4-isoxazolyl)methyl]phthalimide. | 4 s.c. 4 p.o. 8 p.o. | 3 [2] 29 [1] 45 | 19 12 [1] 47 |
| 3-acetamido-N-[(3,5-dimethyl-4-isoxazolyl)methyl]phthalimide. | 4 s.c. 4 p.o. 8 p.o. | 0 [1] 41 [2] 45 | 9 26 [1] 57 |
| 4-hydroxy-N-[(3,5-dimethyl-4-isoxazolyl)methyl]phthalimide. | 4 s.c. 4 p.o. 8 p.o. | [1] 26 0 0 | [2] 34 3 11 |
| 4-methoxy-N-[(3,5-dimethyl-4-isoxazolyl)methyl]phthalimide. | 4 s.c. 4 p.o. 8 p.o. | [1] 39 10 0 | [1] 38 23 14 |
| N-[(3,5-dimethyl-4-isothiazolyl)-methyl]phthalimide. | 4 s.c. 4 p.o. 8 p.o. | [1] 75 [2] 33 27 | [2] 62 [1] 43 [1] 3 |
| N-[(3,5-dimethyl-4-pyrazolyl)-methyl]phthalimide. | 4 s.c. 4 p.o. 8 p.o. | [1] 65 [1] 72 [1] 81 | [2] 56 [1] 80 [1] 72 |

[1] $p<.001$ when compared to group receiving testosterone propionate above.
[2] $p<.01$ when compared to group receiving testosterone propionate above.
[3] $p<.05$ when compared to group receiving testosterone propionate above.

The majority of the compounds of the present invention tested exhibited substantial oral antiandrogenic activity when administered to the test animals as indicated above. The 4-hydroxy- and 4-methoxy-N-[(3,5-dimethyl-4-isoxazolyl)methyl]phthalimides exhibited only subcutaneous activity in this test.

EXAMPLE 19

Capsule formulation

| | Per capsule, mg. |
|---|---|
| N-[3,5-dimethyl-4-pyrazolyl)methyl]phthalimide | 10 |
| Lactose, U.S.P. | 165 |
| Corn starch, U.S.P. | 30 |
| Talc, U.S.P. | 5 |
| Total weight | 210 |

Procedure (1) N-[(3,5-dimethyl - 4 - pyrazolyl)methyl]phthalimide, lactose and corn starch were mixed in a suitable mixer.

(2) The mixture was further blended by passing through a Fitzpatrick comminuting machine with a No. 1A screen with knives forward.

(3) The blended powder was returned to the mixer, the talc added and blended thoroughly.

(4) The mixture was filled into No. 4 hard shell gelatin capsules on a Parke Davis capsulating machine. (Any similar type capsulating machine may be used.)

EXAMPLE 20

Capsule formulation

| | Per capsule, mg. |
|---|---|
| N-[(3,5-dimethyl-4-pyrazolyl)methyl]phthalimide | 50 |
| Lactose, U.S.P. | 125 |
| Corn starch, U.S.P. | 30 |
| Talc, U.S.P. | 5 |
| Total weight | 210 |

Procedure (1) N-[(3,5-dimethyl-4-pyrazolyl)methyl]phthalimide was mixed with lactose and corn starch in a suitable mixer.

(2) The mixture was further blended by passing through a Fitzpatrick comminuting machine with a No. 1A screen with knives forward.

(3) The blended powder was returned to the mixer, the talc added and blended thoroughly.

(4) The mixture was filled into No. 4 hard shell gelatin capsules on a Parke Davis capsulating machine.

EXAMPLE 21

Tablet formulation

| | Per tablet, gm. |
|---|---|
| N-[(3,5-dimethyl-4-pyrazolyl)methyl]phthalimide | 25 |
| Dicalcium phosphate, dihydrate, unmilled | 175 |
| Corn starch | 24 |
| Magnesium stearate | 1 |
| Total weight | 225 |

Procedure (1) [(3,5-dimethyl-4-pyrazolyl)methyl]phthalimide and corn starch were mixed together and passed through a #00 screen in Model "JJ" Fitzmill with hammers forward.

(2) This premix was then mixed with dicalcium phosphate and one-half of the magnesium stearate, passed through a #1A screen in Model "J" Fitzmill with knives forward, and slugged.

(3) The slugs were passed through a #2A plate in a Model "D" Fitzmill at slow speed with knives forward, and the remaining magnesium stearate was added.

(4) The mixture was mixed and compressed.

EXAMPLE 22

Tablet formulation

| | Per tablet, mg. |
|---|---|
| N-[3,5-dimethyl-4-pyrazolyl)methyl]phthalimide | 100 |
| Lactose, U.S.P. | 202 |
| Corn starch, U.S.P. | 80 |
| Amijel B011 [1] | 20 |
| Calcium stearate | 8 |
| Total weight | 410 |

[1] A prehydrolyzed food grade corn starch. Any similar prehydrolyzed corn starch may be used.

Procedure (1) N-[(3,5-dimethyl-4-pyrazolyl)methyl]phthalimide, lactose, corn starch, and Amijel B011 were blended in a suitable mixer.

(2) The mixture was granulated to a heavy paste with water and the moist mass was passed through a #12 screen. It was then dried overnight at 110° F.

(3) The dried granules were passed through a #16 screen and transferred to a suitable mixer. The calcium stearate was added and mixed until uniform.

(4) The mixture was compressed at a tablet weight of 410 mg. using tablet punches having a diameter of approximately ⅜". (Tablets may be either flat or biconvex and may be scored if desired.)

EXAMPLE 23

A 5.0 percent gel of N-[(3,5-dimethyl-4-pyrazolyl)methyl]phthalimide of the following formulation is prepared as described:

| | Gm. |
|---|---|
| N-[(3,5-dimethyl-4-pyrazolyl)methyl]phthalimide | |
| Methyl parabens | 0.08 |
| Propyl parabens | 0.02 |
| Carbopol 934 | 1.25 |
| Aerosol OT | 0.25 |
| Sodium hydroxide (25% w./v.), ca. 7.25 ml. to pH 5.0. | |
| Distilled water, q.s. ad 100 ml. | |

The Aerosol OT was dissolved in ca. 12.5 ml. of distilled water. To this solution there was added the N-[(3,5-dimethyl-4-pyrazolyl)methyl]phthalimide powder which was dispersed by stirring. To a separate 50 ml. portion of distilled water there were added the methyl parabens and the propyl parabens and the mixture heated until a solution was obtained. After cooling the Carbopol 934 was added to this solution with high shear stirring until a homogenous slurry was obtained. The dispersion was then added to the slurry with additional stirring. The mixture was adjusted to pH 5.0 with the sodium hydroxide and the volume adjusted to 100 ml. with additional distilled water yielding the desired gel composition.

EXAMPLE 24

N-[1,3,5-trimethyl-4-pyrazolyl)methyl]phthalimide

The procedure of Example 12 was used employing N-(2,2-diacetylethyl)phthalimide and methyl hydrazine to produce the above-captioned product in 80.2% yield as irregular white prisms, M.P. 139.5–142°.

*Analysis.*—Calcd. for $C_{15}H_{15}O_2N_3$ (percent): C, 66.90; H, 5.61; N, 15.61. Found (percent): C, 67.01; H, 5.52; N, 15.56.

IR $(CHCl_3)$ 1773 and 1719 cm.$^{-1}$ (imide), and 1619 and 1571 cm.$^{-1}$ (aromatic).

UV $(C_2H_5OH)$ 218 nm. ($\epsilon$=44,800), 240 nm. (sh., $\epsilon$=9,100) and 296 nm. ($\epsilon$=1,900).

What is claimed is:

1. A compound of the formula wherein X is —O—, —S— or —$NR_4$— wherein $R_4$ is hydrogen or lower alkyl; Y is $$-H, -OR_3, -NO_2, -NH_2 \text{ of } -NH\overset{O}{\underset{\|}{C}}R$$

where R is lower alkyl or phenyl optionally substituted by lower alkyl, lower alkoxy, nitro or halo and $R_3$ is lower alkyl or hydrogen; and $R_1$ and $R_2$ each independently is lower alkyl; provided that when X is O, Y is attached to the 4-carbon atom when Y is —$OR_3$ and the carbon atom when Y is —$NO_2$.

2. The compound of claim 1 wherein X is O.

3. The compound of claim 2 wherein Y is hydrogen.

4. The compound of claim 3 which is N-[(3,5-dimethyl-4-isoxazolyl)methyl]phthalimide.

5. The compound of claim 3 which is N-[(3-ethyl-5-methyl-4-isoxazolyl)methyl]phthalimide.

6. The compound of claim 2 wherein Y is substituted on the 3-carbon atom.

7. The compound of claim 6 which is N-[(3,5-dimethyl-4-isoxazolyl)methyl]-3-nitrophthalimide.

8. The compound of claim 6 which is N-[(3,5-dimethyl-4-isoxazolyl)methyl]-3-aminophthalimide.

9. The compound of claim 6 which is 3-acetamido-N-[(3,5-dimethyl-4-isoxazolyl)methyl]phthalimide.

10. The compound of claim 2 wherein Y is substituted on the 4-carbon atom.

11. The compound of claim 10 which is 4-hydroxy-N-[(3,5-dimethyl-4-isoxazolyl)methyl]phthalimide.

12. The compound of claim 10 which is 4-methoxy-N-[(3,5-dimethyl-4-isoxazolyl)methyl]phthalimide.

13. The compound of claim 10 which is 4-amino-N-[(3,5-dimethyl-4-isoxazolyl)methyl]phthalimide.

14. The compound of claim 10 which is 4-acetamido-N-[(3,5-dimethyl-4-isoxazolyl)methyl]phthalimide.

15. The compound of claim 1 wherein X is —$NR_4$—.

16. The compound of claim 15 which is N-[(3,5-dimethyl-4-pyrazolyl)methyl]phthalimide.

17. The compound of claim 15 which is N-[(3,5-dimethyl-4-pyrazolyl)methyl]-3-nitrophthalimide.

18. The compound of claim 15 which is N-[3,5-dimethyl-4-pyrazolyl)methyl]-4-nitrophthalimide.

19. The compound of claim 15 which is 3-amino-N-[(3,5-dimethyl-4-pyrazolyl)methyl]phthalimide.

20. The compound of claim 15 which is 4-amino-N-[(3,5-dimethyl-4-pyrazolyl)methyl]phthalimide.

21. The compound of claim 15 which is 3-acetamido-N[(3,5-dimethyl-4-pyrazolyl)methyl]phthalimide.

22. The compound of claim 15 which is 4-acetamido-N-[(3,5-dimethyl-4-pyrazolyl)methyl]phthalimide.

23. The compound of claim 1 wherein X is S.

24. The compound of claim 23 which is N-[(3,5-dimethyl-4-isothiazolyl)methyl]phthalimide.

25. The compound of claim 23 which is N-[(3,5-dimethyl-4-isothiazolyl)methyl]-3-nitrophthalimide.

26. The compound of claim 23 which is N-[(3,5-dimethyl-4-isothiazolyl)methyl]-4-nitrophthalimide.

27. The compound of claim 23 which is 3-amino-N-[(3,5-dimethyl-4-isothiazolyl)methyl]phthalimide.

28. The compound of claim 23 which is 4-amino-N-[(3,5-dimethyl-4-isothiazolyl)methyl]phthalimide.

29. The compound of claim 23 which is 3-acetamido-N-[(3,5-dimethyl-4-isothiazolyl)methyl]phthalimide.

30. The compound of claim 23 which is 4-acetamido-N-[(3,5-dimethyl-4-isothiazolyl)methyl]phthalimide.

31. The compound of claim 15 wherein $R_4$ is lower alkyl.

32. The compound of claim 31 which is N-[(1,3,5-trimethyl-4-pyrazolyl)methyl]phthalimide.

References Cited

UNITED STATES PATENTS

| | | | |
|---|---|---|---|
| 2,996,501 | 8/1951 | Doyle et al. | 260—307 H |
| 3,174,976 | 3/1965 | Cambron | 260—302 H |
| 3,435,022 | 3/1969 | Voltz | 260—310 R |

OTHER REFERENCES

Adams et al.: Chem. Abstracts, 54:12113d (1960).
Jongs et al.: Chem. Abstracts, 48:11397f (1954).

RICHARD J. GALLAGHER, Primary Examiner

U.S. Cl. X.R.

260—302 A, 307 H, 310 R, 326 A; 424—270, 272, 273